United States Patent [19]
Campbell

[11] 3,708,187
[45] Jan. 2, 1973

[54] CONDUIT SEAL
[75] Inventor: George L. Campbell, Scottsdale, Ariz.
[73] Assignee: Garland Steel Company
[22] Filed: Feb. 7, 1972
[21] Appl. No.: 223,957

[52] U.S. Cl. ................285/373, 277/199, 285/424, 285/DIG. 4
[51] Int. Cl. .............................................F16l 21/06
[58] Field of Search.........285/373, 424, DIG. 4, 236; 277/199, 221

[56] References Cited

UNITED STATES PATENTS

| 2,555,647 | 6/1951 | King | 277/199 X |
| 3,129,021 | 4/1964 | Willis et al. | 277/199 X |
| 3,239,254 | 3/1966 | Campbell | 285/DIG. 4 |
| 3,305,241 | 2/1967 | Hart | 277/199 X |
| 3,315,991 | 4/1967 | Davis | 285/424 X |
| 3,318,605 | 5/1967 | Brown | 277/199 X |
| 3,501,179 | 3/1970 | Boynton et al. | 285/373 |

FOREIGN PATENTS OR APPLICATIONS

| 595,843 | 12/1947 | Great Britain | 277/221 |

Primary Examiner—Thomas F. Callaghan
Attorney—William C. Cahill et al.

[57] ABSTRACT

A device is disclosed for sealing abutted spirally corrugated conduits. The corrugations of each section of spirally corrugated conduits terminate on a bias. When two sections of spirally corrugated conduit are abutted, the conduits are rotated to obtain registration between the corrugations of one conduit with the corrugations of the abutted conduit, presenting a seemingly endless plurality of spirally wound corrugations. A plurality of sealing members, each having an undulating lower surface, are keyed to one another with the resulting plurality of attached members wound about the abutting conduits. A tensionable band is secured about the outer surfaces of the members and aligned with the abutted conduits. The band is tensioned to compress the members, thereby sealing the members against the abutting conduits and against each other. The undulations on the inner surfaces of the members conform to the undulating surface of the conduit and thereby effect a seal between the abutting conduits.

8 Claims, 4 Drawing Figures

PATENTED JAN 2 1973

3,708,187

CONDUIT SEAL

The present invention relates to devices for sealing abutted conduits.

Circularly corrugated conduits are well known in the art and sealing abutted ones of said conduits may be effected by a simple band tightened about the two abutting conduits. The cost of circularly corrugated conduits is substantially greater than that of spirally corrugated conduits. However, employment of the latter type of conduits has been minimal where an effective seal between abutting conduits was required.

The extremities of a section of spirally corrugated conduit defines an undulating end. The undulations do not lend themselves to any of the well known inexpensive methods for sealing these types of conduits. A method previously used for sealing spirally corrugated conduits has been that of abutting the conduits with one another and rotating the respective conduits until registration between the two sets of undulating surfaces are in registration. Any gap caused by less than complete abutment of the two conduits resulted in a leakage of the fluid contained therein, whether it be liquid or gas. Even with precise abutment, normal manufacturing tolerances preclude the lack of any irregularities along the edges of the conduit. When such conduit was buried, the material surrounding the conduit aided in plugging up and at least partially sealing the gaps between the abutting conduits. In applications permitting some leakage of the fluid, the above-described method of abutting and sealing the spirally corrugated conduits was satisfactory. However, where the length of the conduit was substantial, the total amount of leakage may represent a substantial loss of the fluid flowing therein and therefore wholly unacceptable.

It is therefore a primary object of the present invention to provide a device for sealing spirally corrugated conduits.

It is another object of the present invention to provide a seal for abutting spirally corrugated conduits which does not require exact and precise alignment between the abutting conduits.

Another object of the present invention is to provide a compressible seal for abutting spirally corrugated conduits to compensate for errors or misalignment in securing the seal to the conduits.

Another object of the present invention is to provide a nonpermanently attached seal for spirally corrugated conduits.

Another object of the present invention is to provide a seal for spirally corrugated conduits which may be attached by unskilled laborers.

Another object of the present invention is to provide a seal having a plurality of interconnectable parts to facilitate storage and transportation of the seal.

Another object of the present invention is to provide a plural member seal, each member having a key and a keyway co-operating with adjacent members.

Another object of the present invention is to provide a simple means for securing a multiple member seal to spirally corrugated conduits.

These and other objects of the present invention will become apparent to those skilled in the art as the description thereof proceeds.

Spirally corrugated conduits have undulating ends. When abutting two such conduits, the ends thereof must register with one another to minimize the gaps that might occur if a crest of one conduit registered with the trough of another conduit. When these conduits are in registration, there will still exist gaps between the two conduits due to slight imperfections in cutting the ends of the conduits. The present invention teaches a sealing device for sealing the joints between two abutting spirally corrugated conduits despite some misregistration between the conduits and the end indentations due to manufacturing tolerances. A plurality of compressible members, each member having an inner surface conforming to one period of the undulations, and a smooth upper surface. Each of these members are mounted adjacent one another about the joint, each registering with adjacent crests of the undulations. A tensionally adjustable band is wrapped about the plurality of adjacent members. The band is placed in tension to compress the members against the joint and one another. The compressed members will provide a bridge across any gaps between two abutting conduits and will prevent a flow of fluid from within the respective conduits between the member and the outer surface of the respective conduits. Each of the members may have a key extending from one lateral side and a keyway disposed in another lateral side. The key of one member engages the keyway of the adjacent member and thereby forms a ring of members. The keys not only physically interlock one member with another, but provide a further constraint against a seepage or flow of fluid between adjacent compressible members.

The present invention may be described with more clarity and specificity in reference to the following drawings, in which.

Figure 1:
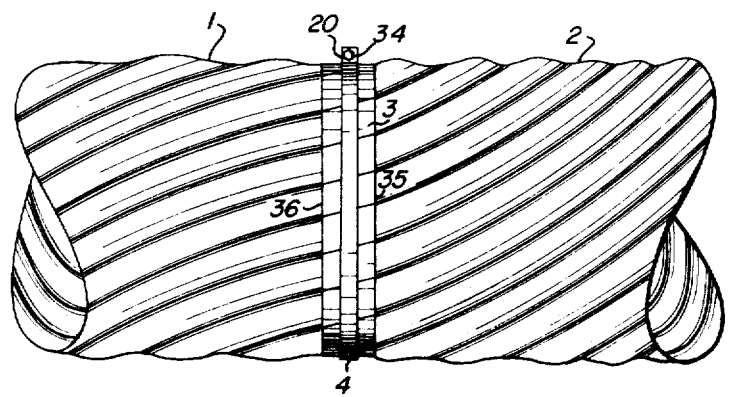
FIG. 1 illustrates the present invention sealing two abutting spirally corrugated conduits.

Referring to FIG. 1, there is shown two abutting spirally corrugated conduits 1 and 2. The joint between the two conduits 1 and 2 is covered by a plurality of sealing members 3 placed adjacent to one another. Each of the members 3 extend from the trough of one corrugation to the trough of an adjacent corrugation. A tensionable band 4 extends about the plurality of members 3. Band 4 is tensionally secured to the plurality of members 3 by tightening a bolt 34 with accompanying nut extending through a pair of apertures in the flanges (identified collectively by the numeral 20). Each of the flanges is disposed at the respective ends of band 4. As may be seen in the drawings, each of the plurality of members 3 are at a bias with respect to the longitudinal axes of the conduits 1 and 2 in order for the plurality of members 3 to be aligned with the spirally wound corrugations.

Figure 2:
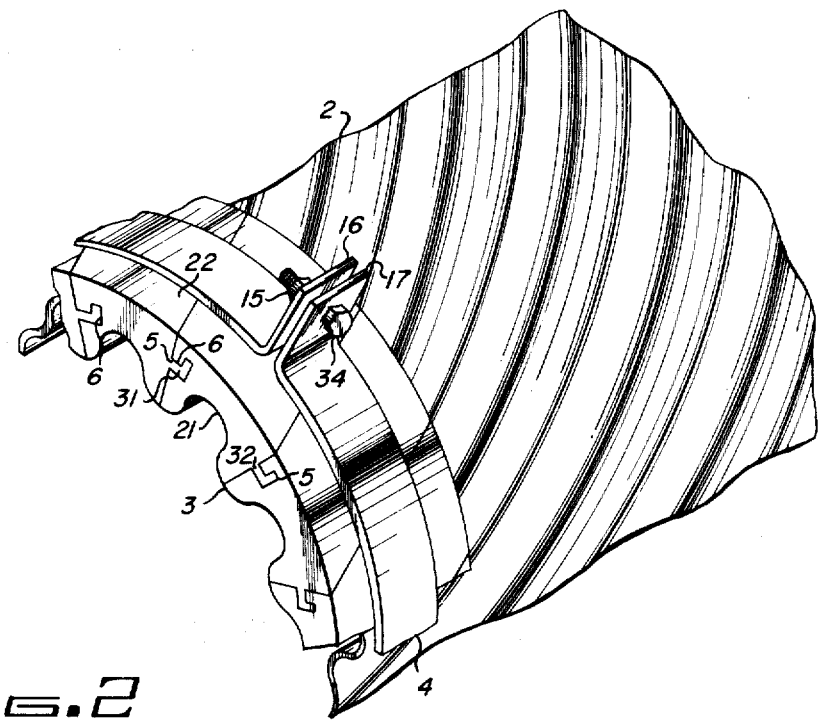
FIG. 2 illustrates a perspective view of the present invention in relationship to a spirally corrugated conduit.

FIG. 2 illustrates in more detail the relationship between spirally corrugated conduit 2, the plurality of members 3, and the band 4. Each of the members 3 has an undulating inner surface 21, which surface 21 is a duplicate, but in reverse, of the surface of conduit 2.

Each member 3 spans one period, that is, the distance from the center of one trough to the center of an adjacent trough of the undulations produced by the spiral corrugations. The outer surface 22 of each plurality of members 3 may be smooth. A band 4 having flanges 16 and 17 disposed at the ends thereof is wrapped about the plurality of members 3 in line with the respective edges of the abutting conduits, as more clearly shown in FIG. 1. The flanges 16 and 17 are drawn toward one another by threading a nut 15 onto bolt 34. As the flanges 16 and 17 are drawn toward one another, the band 4 will tend to compress each of the plurality of members 3 against the abutting conduits.

Figure 3:
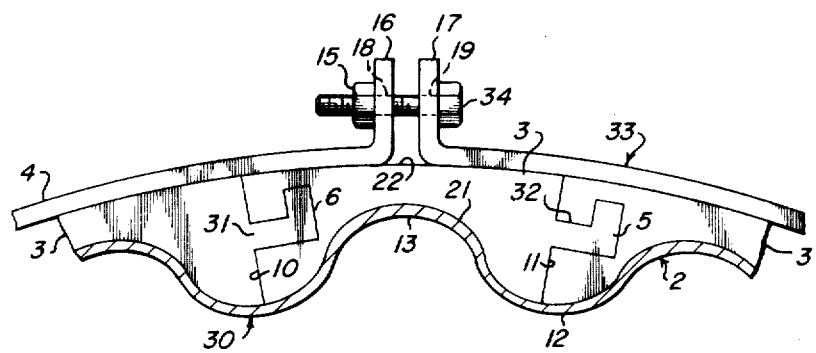
FIG. 3 illustrates a cross section of the present invention.

FIG. 3 illustrates, in cross section, the relationship between the band 4, the members 3, and the spirally corrugated conduit 2. The end of the conduit 2 is in the form of a periodic undulating edge, having crests 13 and troughs 12. The inner surface 21 of a member 3 is configured to duplicate the outer surface of the conduit 2. Each member 3 extends the length of one period of the undulations of conduit 2. In the embodiment shown, the member 3 extends from the center point of a first trough 30 to the center point of the next adjacent trough 12. One lateral side 11 of member 3 includes a longitudinally extending key 5. The cross section of key 5 is shown as an L shape. The key 5 is keyed within keyway 32 of the member 3 adjacent lateral side 11. Another lateral side 10 of member 3 includes a longitudinal keyway 6. Keyway 6 is shown as L-shaped to receive a key 31 protruding from the member 3 adjacent lateral side 11.

The outer surface 22 of each of the members 3 is a smooth surface. The plurality of smooth outer surfaces 22 of each of the adjacent members 3 defines a smooth surface envelope 33 extending about the conduit 2.

A band 4 extends about the smooth surfaced envelope 33. Means are provided for tightening band 4 about the envelope 33. The means may include a pair of flanges 16 and 17 angularly extending outwardly at the two extremities of the band 4. A bolt 34, extending through apertures 19 in flange 17 and aperture 18 in flange 16, engaging nut 15, may be used to tighten the band 4 about the envelope 33. Tightening the band 4 about the envelope 33 will produce a compressive effect upon each of the members 3. The compression of members 3 will tend to seal the members against the conduit 2 to prevent a flow of fluid between the inner surface 21 of member 3 and the outer surface of conduit 2. Additionally, the compression of member 3 will tend to force adjacent members 3 toward one another and inhibit any flow of fluid between the lateral sides of adjacent members 3. The cooperation of the keys and their respective keyways will further inhibit any flow of fluid.

Aside from inhibiting a flow of fluid between adjacent members 3, the keys and their corresponding keyways serve an additional purpose. In attaching the sealing device of the present invention, time is equatable with money and therefore the greater time that it takes to seal abutting conduits, the more costly will be the installation of the respective conduits. To speed up the attachment of the sealing device of the present invention, a plurality of members 3 may be joined to one another by inserting the key of one member into the keyway of an adjacent member, thus forming a chain of members 3. The length of the chain of members 3 should be sufficient to encircle the abutting conduits 1 and 2. When sealing abutting conduits 1 and 2, the plurality of attached members 3 may be simply wrapped about the abutting conduits 1 and 2. The ends of the chain of members 3 are then attached to one another by engaging the protruding key in one end with the keyway in the other end, thus forming a continuous ring of members 3. The number of members 3 within the ring must, of course, correspond with the number of corrugations about the respective conduits. After the ring of members 3 has been mounted about the conduits 1 and 2, the band 4 may be easily and simply wrapped about the ring of members 3 and tightened thereabout.

As the ring of members 3 represent a continuous ring mounted essentially perpendicular to the longitudinal axes of the conduits 1 and 2, the troughs 12 and crests 13 of the spirally wound corrugations are at an angle with respect to the ring of members 3. In order to accommodate the angle between the ring of members 3 and the spirally wound corrugation, the members 3 must be mounted at a bias with respect to the longitudinal axis of the conduits 1 and 2. If the members 3 are constructed as essentially rectangular members, and subsequently mounted at a bias with respect to the longitudinal axes of conduits 1 and 2, the corners of the members 3 will present a stairstep-like side. This stairstep-like side will require skill in assembling the ring of members 3. For this reason, the sides 35 and 36 of each of the members 3 should be at an angle with respect to the longitudinal axes, that is, the crest of the inner surface 21 of each of the members 3. With sides 35 and 36 cut at a bias, each of the members 3 may define a parallelogram in the plane of the longitudinal and lateral axes, as shown in FIG. 1. The ring of members 3 can then be assembled in a very rapid fashion, requiring a minimum of skill in aligning the sides 35 and 36 of each of the members 3. On alignment, the workmen will be assured that the center of the ring of members 3 will in fact correspond with the joint between two abutted spirally corrugated conduits 1 and 2.

Figure 4:
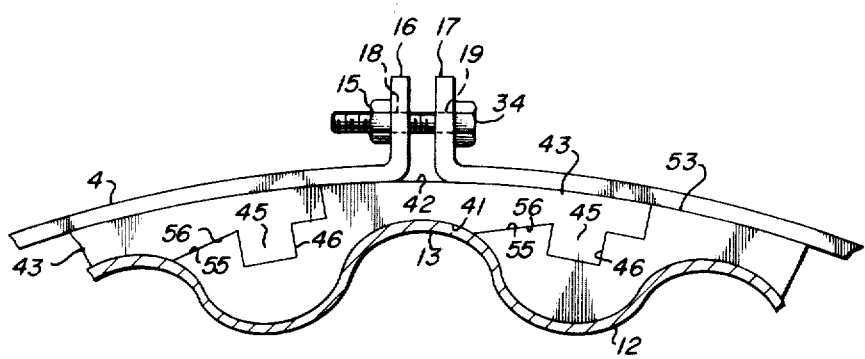
FIG. 4 illustrates a cross section of a modified form of the present invention.

FIG. 4 illustrates another embodiment of the members 3, identified herein as members 43. Each of the members 43 extends across the respective conduits for a distance equivalent to a period of the undulations, that is, the distance between the center of adjacent troughs. However, the members do not terminate at either the troughs 12 or the crests 13. Instead, each of the members 43 overlaps adjacent members 43. The overlapping lateral edges 55 and 56 of each of the members 43 includes a key 45 on one lateral edge 56 and a keyway 46 on another lateral edge 55. The keyway 46 receives the key 45 of an adjacent member 43. Each of the members 43 includes an inner surface 41 corresponding to the undulations of the spirally corrugated conduits adjacent thereto. The upper surface 42 of each of the members 43 is a smooth flat surface. Each of the members 43 are positioned about the abutting conduits 1 and 2 such that the keyways 46 of one member receives the key 45 of an adjacent member. The band 4 is then wrapped about the outer surface 42 identified collectively as envelope 53 and tightened with bolt 34 and nut 15 as described above.

The compressive force exerted by band 4 about the members 43 provides a seal between the inner surface 41 of each of the members 43 and the outer surface of the adjacent conduit. The surfaces of one member 43, overlapping the surfaces of an adjacent member 43, are also compressed against one another to form a seal preventing the flow of fluid between adjacent members 43.

Each of the members 43 may appear to define a rectangle in the plane of the longitudinal and lateral axes. Or, they may appear to be parallelograms, as shown in FIG. 1.

I claim:

1. A device for sealing abutting spirally corrugated conduits, said device comprising in combination:
   a plurality of adjacent compressible members extending about said abutted conduits, each said member having an undulating surface in contact with said conduits,
   a key extending from a lateral side of each of said members,
   a keyway disposed within another lateral side of each of said members for receiving the key of an adjacent one of said members, and
   a tensionable band encircling said plurality of members, whereby said band may be tightened to compress said plurality of members against one another and against said abutting pipes to form a seal between said abutting pipes.

2. The device as set forth in claim 1, wherein said members comprise
   an inner surface duplicating one period of the undulations of said conduit, and
   a smooth outer surface.

3. The device as set forth in claim 2, wherein said lateral sides are substantially perpendicular to said smooth outer surface.

4. The device as set forth in claim 2, wherein the angles formed between each of said lateral sides and said smooth surface are supplementary angles.

5. The device as set forth in claim 2, wherein said member extends from the trough of one corrugation to the trough of an adjacent corrugation.

6. The device as set forth in claim 2, wherein
   each of said keys is L-shaped in cross section, and
   each of said keyways is L-shaped in cross section.

7. The device as set forth in claim 2, wherein
   the periphery of said smooth surface defines a parallelogram.

8. The device as set forth in claim 1, wherein said band includes
   an apertured flange at each end of said band, and
   means for drawing said flanges toward one another.

* * * * *